(No Model.)
W. E. BROOKE.
SAW TOOTH.
No. 504,412.  Patented Sept. 5, 1893.
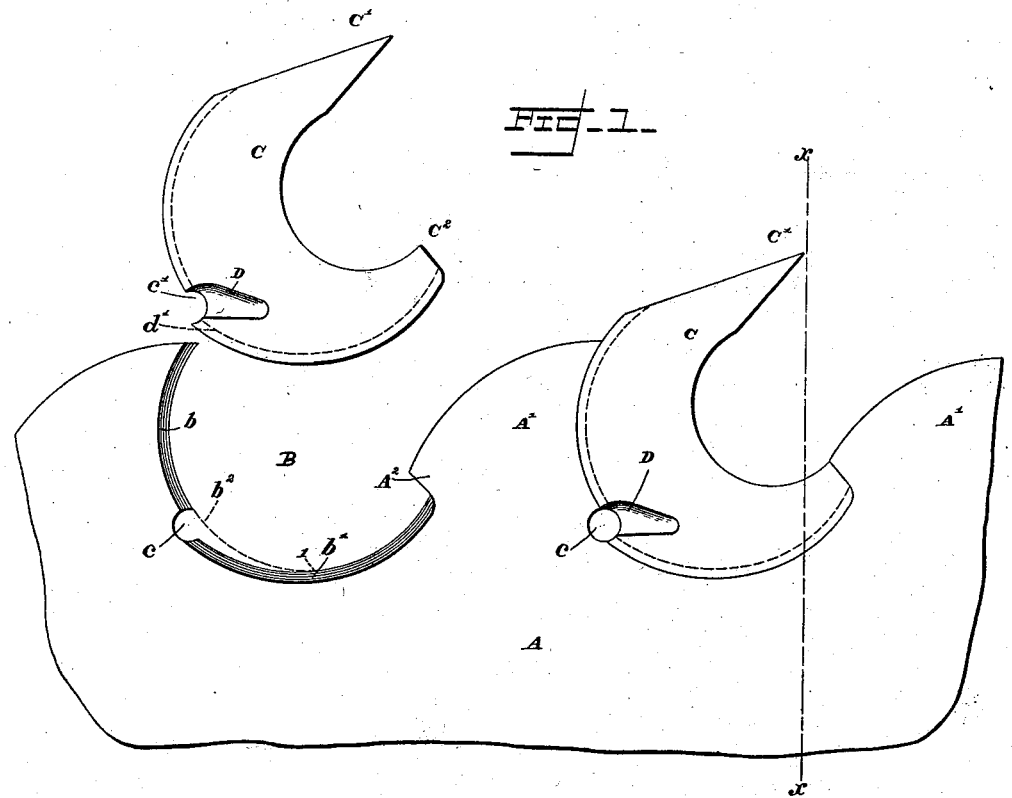
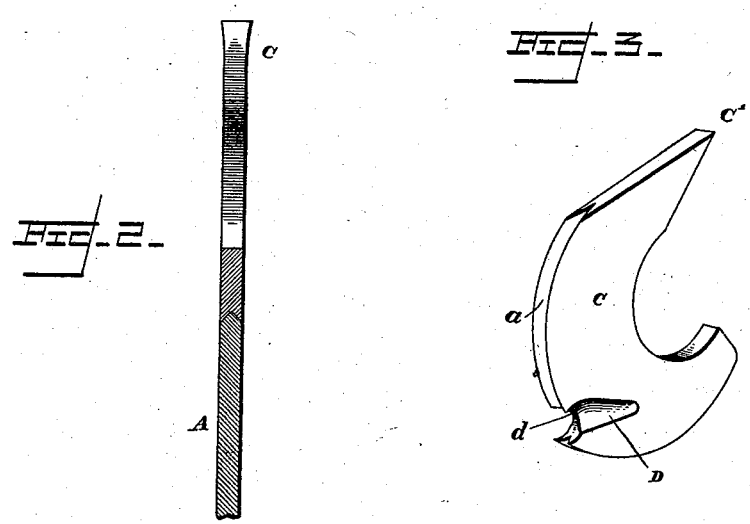
Witnesses
Edw. S. Duvall Jr.
Wm. L. Boyden
Inventor
William E. Brooke
per Fred E. Tasker,
Attorney

UNITED STATES PATENT OFFICE.

WILLIAM E. BROOKE, OF TRENTON, ASSIGNOR OF ONE-FOURTH TO THOMAS H. CLARK, OF SCUDDER'S FALLS, NEW JERSEY.

SAW-TOOTH.

SPECIFICATION forming part of Letters Patent No. 504,412, dated September 5, 1893.

Application filed September 22, 1892. Serial No. 446,547. (No model.)

*To all whom it may concern:*

Be it known that I, WILLIAM E. BROOKE, a citizen of the United States, residing at Trenton, in the county of Mercer and State of New Jersey, have invented certain new and useful Improvements in Saw-Teeth; and I do hereby declare the following to be a full, clear, and exact description of the invention, such as will enable others skilled in the art to which it appertains to make and use the same.

My present invention has reference to an improvement in saw teeth, the object of the invention being to simplify and perfect the construction of teeth of that class known as insertible teeth which are inserted into the saw plate and which are easily and readily withdrawn therefrom when occasion requires, and the invention therefore consists in the construction, arrangement and combination of parts substantially as will be hereinafter described and claimed.

In the annexed drawings illustrating my invention: Figure 1 is a side elevation of a section of a saw-plate provided with my improved insertible teeth. Fig. 2 is a cross section of the same on the line $x$ $x$ of Fig. 1. Fig. 3 is a detail perspective view of one of the saw teeth.

Similar letters of reference designate corresponding parts in the several figures.

A designates a portion of the saw-plate provided with the teeth-receiving recesses B, between which are the projections A' of the plate. The recesses B have the two edges $b$ and $b'$ cut substantially on the curve of one circle, that is to say, the line of said edges is a semicircle including the dotted line $b^2$, but at the point $l$, the edge $b'$ is curved out of the aforesaid true semicircle and carried at an angle to the dotted line $b^2$, to the point where the semicircular notch $c$ which forms a part of the rivet hole is located. Said notch $c$ is placed about midway of the length of the tooth receiving recess. Thus said tooth receiving recess may be said to be formed on the semicircle with an offset line near its middle part at the point where the rivet hole is situated.

C denotes one of the teeth, having the point C' and having at its other end a flattened part $C^2$, which when the tooth is in position in the recess, comes in contact with the end or shoulder $A^2$, formed on the saw plate A at the end of the recess B. The back or rear edge of the tooth C is curved, to conform to the curvature of the edge of the recess B, that is to say, said back or rear edge is substantially cut on a semicircular line, but has a part thereof offset from the true semicircular line to provide the shoulder $d'$ at a point adjacent to the rivet hole so that the tooth may come closely into contact with the edges of the recess B. Furthermore, it will be particularly noted that the tooth C is provided near the semicircular notch $c'$ which forms the other part of the rivet hole with lateral depressions or recesses D D, one on each side of the tooth so that the substance of the tooth is, at the point of the rivet hole, reduced in thickness considerably as shown at $d$, in Fig. 3. These depressions or grooves D are used for the purpose of inserting a tool for the easy dislodgment of the rivet and also for the purpose of enabling the rivet to be more readily fixed in position in its hole $c$ $c'$. It will be observed moreover, that the edges $b$ $b'$ of the recess B are provided with the ordinary V-shaped tongue which enters the ordinary V-shaped groove $a$, cut on the rear edge of the tooth C.

Having thus described my invention, what I claim as new, and desire to secure by Letters Patent, is—

The combination with the saw plate A, having a recess B, formed with the two edges $b$ and $b'$, cut substantially on the curve of one circle, said recess having also the end shoulder $A^2$ and the semicircular notch $c$, the recess edge between the semicircular notch $c$ and the edge $b'$ being offset from the true semicircular line $b^2$ from the point $l$ to the semicircular notch $c$, and the tooth C having point C' at one end and at the other end a flattened part $C^2$, which when the tooth is in position in the recess, comes in contact with the end shoulder $A^2$ at the end of the recess B, said tooth having its back or rear edge formed substantially on a semicircular line but with a part thereof offset from the true semicircular line to provide the shoulder $d'$ at a point adjacent to the semicircular notch $c$ and formed likewise with the semicircular notch $c'$ which unites with the semicircular notch to form a rivet hole $c$ as shown and said tooth further having the lateral depressions or recesses D D used for the purpose of inserting a tool for the easy dislodgment of the rivet, substantially as described.

In testimony whereof I affix my signature in presence of two witnesses.

WILLIAM E. BROOKE.

Witnesses:
C. S. RUSSELL,
JAMES BARNER.